(12) United States Patent
Tobin et al.

(10) Patent No.: US 10,641,240 B2
(45) Date of Patent: May 5, 2020

(54) METHODS OF JOINING ROTOR BLADE COMPONENTS USING THERMOPLASTIC WELDING

(71) Applicant: General Electric Company, Schenectady, NY (US)

(72) Inventors: James Robert Tobin, Simpsonville, SC (US); Aaron A. Yarbrough, Greenville, SC (US); Daniel Alan Hynum, Simpsonville, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 15/437,527

(22) Filed: Feb. 21, 2017

(65) Prior Publication Data
US 2018/0238299 A1    Aug. 23, 2018

(51) Int. Cl.
*B32B 37/00*      (2006.01)
*F03D 1/06*       (2006.01)
(Continued)

(52) U.S. Cl.
CPC ............ *F03D 1/0675* (2013.01); *B29C 65/02* (2013.01); *B29C 65/488* (2013.01);
(Continued)

(58) Field of Classification Search
CPC ... B29C 65/02; B29C 65/4815; B29C 65/488; B29C 65/526; B29C 65/527;
(Continued)

(56) References Cited

U.S. PATENT DOCUMENTS

| 4,647,325 A | * | 3/1987 | Bach .................. B29C 65/08 |
| | | | 156/290 |
| 6,264,877 B1 | | 7/2001 | Pallu De La Barriere |

(Continued)

FOREIGN PATENT DOCUMENTS

| CN | 101906251 | 8/2010 |
| JP | 2007-92716 | 4/2007 |

(Continued)

OTHER PUBLICATIONS

Teuwen, et al.; "Vacuum Infused Thermoplastic Composites for Wind Turbine Blades," 2008 Wind Turbine Blade Workshop, Sandia National Laboratories—Presentation—May 12-14, 2008; (22 pages).

(Continued)

*Primary Examiner* — James D Sells
(74) *Attorney, Agent, or Firm* — Dority & Manning, P.A.

(57) ABSTRACT

The present disclosure is directed to methods for joining rotor blade components using thermoplastic welding. The method includes arranging a first thermoplastic component and a second thermoplastic component together at an interface, determining a size of a tolerance gap between the first and second components at the interface, placing a thermoplastic insert between the first and second components at the interface, the insert being larger than the tolerance gap, heating the insert and the first and second components such that the insert begins to flow so as to fill the tolerance gap between the first and second components, applying pressure to the interface such that the insert and the first and second blade components remain substantially in direct contact with each other at the interface, and welding the insert and the first and second components together at the interface, wherein the heat and the applied pressure between the insert and the first and second components at the interface main- (Continued)

tain the insert and the first and second substantially in direct contact at the interface during welding.

18 Claims, 10 Drawing Sheets

(51) Int. Cl.
*B29C 65/02* (2006.01)
*B29C 65/00* (2006.01)
*B29C 65/48* (2006.01)
*B29C 65/52* (2006.01)
*B29C 65/78* (2006.01)
*B29L 31/08* (2006.01)
*B29C 65/50* (2006.01)

(52) U.S. Cl.
CPC ........ *B29C 65/4815* (2013.01); *B29C 65/526* (2013.01); *B29C 65/527* (2013.01); *B29C 65/7855* (2013.01); *B29C 66/1122* (2013.01); *B29C 66/1142* (2013.01); *B29C 66/43* (2013.01); *B29C 66/54* (2013.01); *B29C 66/543* (2013.01); *B29C 66/721* (2013.01); *B29C 66/72141* (2013.01); *B29C 66/73921* (2013.01); *B29C 65/5014* (2013.01); *B29C 65/5057* (2013.01); *B29C 66/7212* (2013.01); *B29L 2031/085* (2013.01); *F05B 2230/232* (2013.01); *F05B 2280/4007* (2013.01); *Y02E 10/721* (2013.01); *Y02P 70/523* (2015.11)

(58) Field of Classification Search
CPC ............. B29C 65/7855; B29C 66/1122; B29C 66/1142; B29C 66/43; B29C 66/54; B29C 66/543; B29C 66/721; B29C 66/72141; B29C 66/73921
USPC ........................................................ 156/73.5
See application file for complete search history.

(56) References Cited

U.S. PATENT DOCUMENTS

| | | | |
|---|---|---|---|
| 8,317,479 | B2 | 11/2012 | Vronsky et al. |
| 8,506,258 | B2 * | 8/2013 | Baker .................. F03D 1/0675 416/226 |
| 8,657,581 | B2 | 2/2014 | Pilpel et al. |
| 8,673,106 | B1 | 3/2014 | Jolley et al. |
| 8,747,098 | B1 | 6/2014 | Johnson et al. |
| 8,961,142 | B2 | 2/2015 | Wansink |
| 8,992,813 | B2 | 3/2015 | Robbins et al. |
| 2009/0148300 | A1 | 6/2009 | Driver et al. |
| 2011/0059290 | A1 | 3/2011 | Gage et al. |
| 2011/0097211 | A1 | 4/2011 | Rudling |
| 2013/0164133 | A1 | 6/2013 | Grove-Nielsen |
| 2014/0295187 | A1 | 10/2014 | Jacobsen et al. |
| 2017/0080648 | A1 | 3/2017 | Tobin et al. |

FOREIGN PATENT DOCUMENTS

| | | |
|---|---|---|
| KR | 10-2009-0091912 A | 8/2009 |
| KR | 10-2010-0035450 A | 4/2010 |
| WO | WO2010/025830 A2 | 3/2010 |
| WO | WO2011/088835 A2 | 7/2011 |
| WO | WO2011/098785 A2 | 8/2011 |
| WO | WO2015/015202 A1 | 2/2015 |
| WO | 2017/012633 A1 | 1/2017 |

OTHER PUBLICATIONS

U.S. Appl. No. 14/852,899, filed Sep. 14, 2015.
U.S. Appl. No. 15/075,303, filed Mar. 21, 2016.
International Search Report and Written Opinion issued in connection with corresponding PCT Application No. PCT/US18/30352 dated Nov. 30, 2018.

* cited by examiner

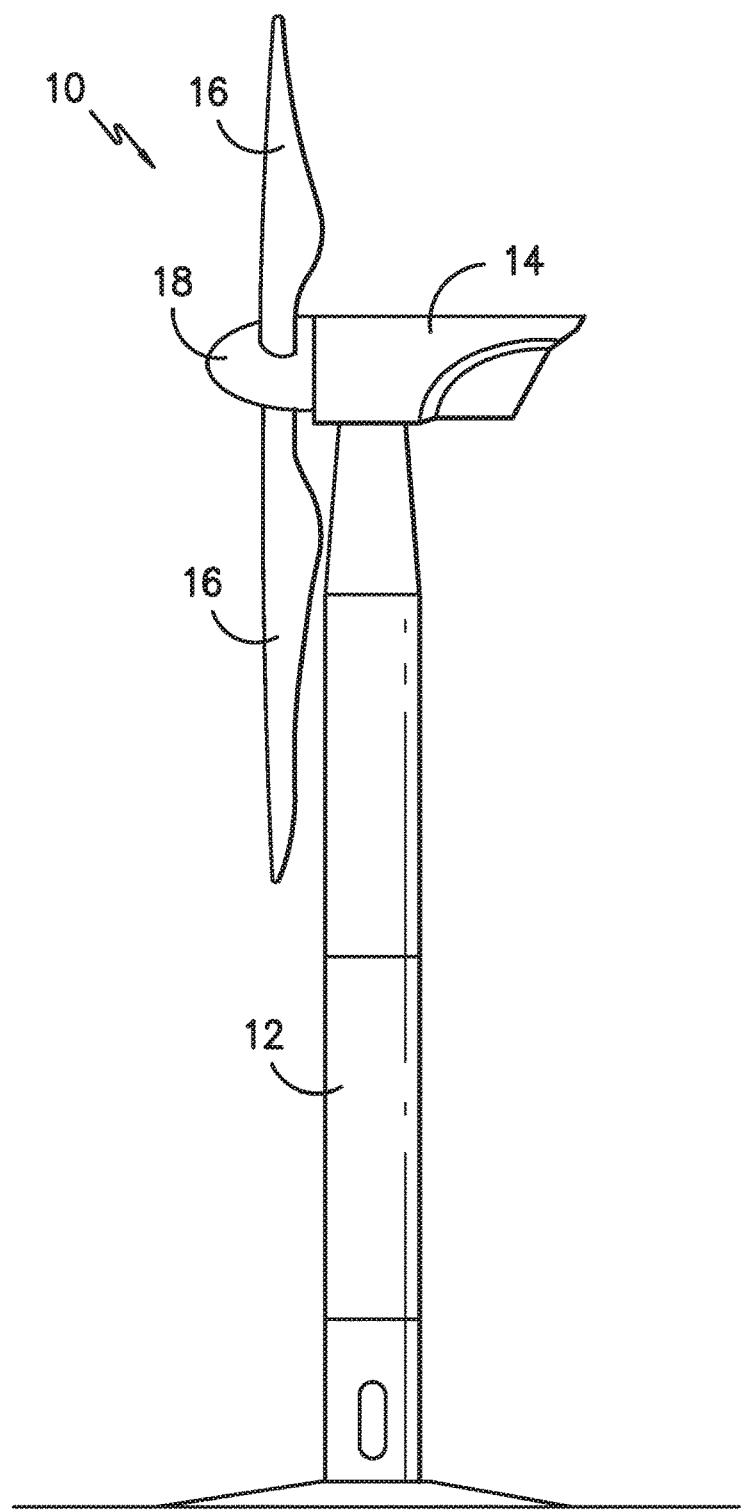
FIG. -1-

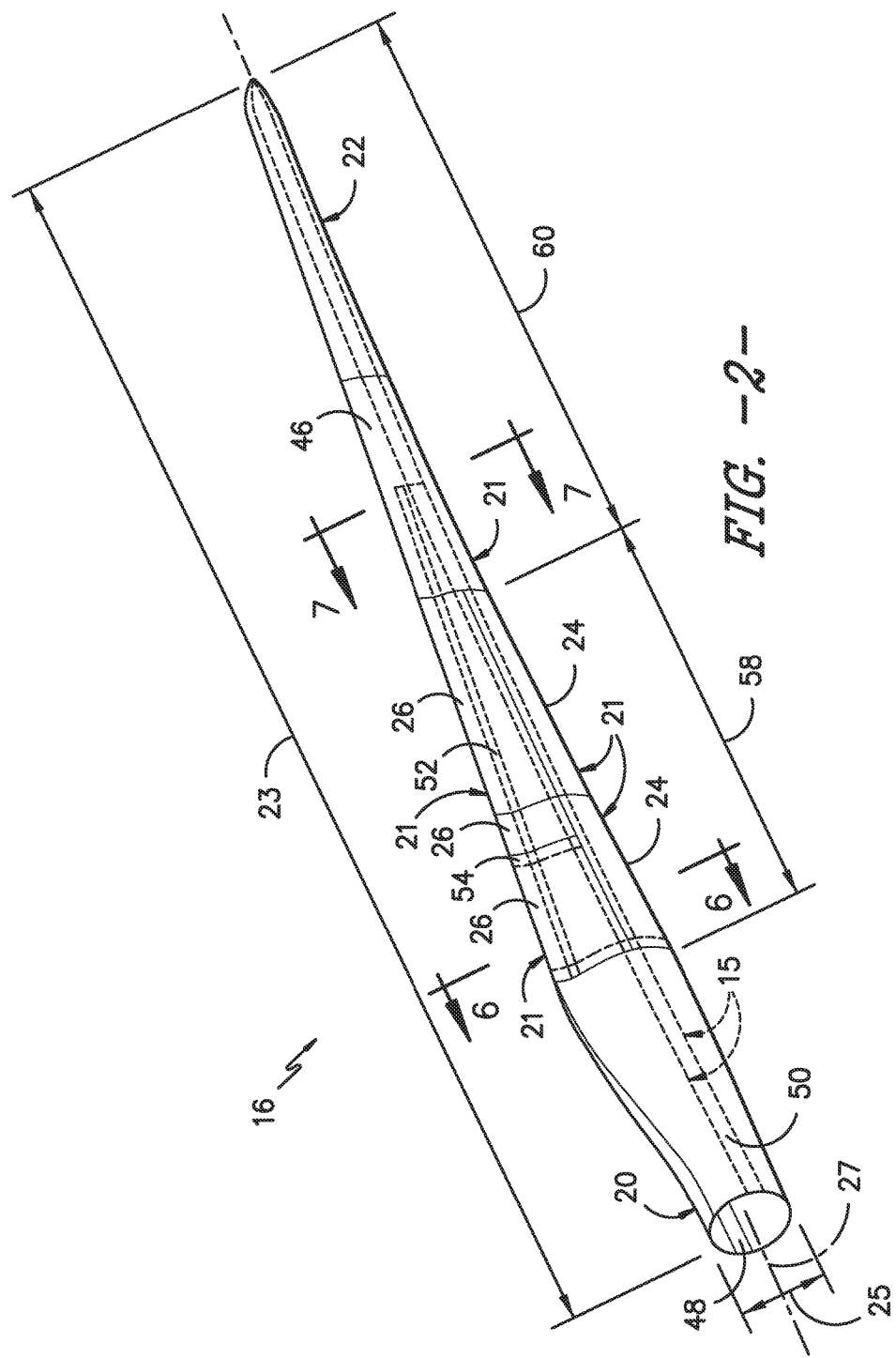
FIG. -2-

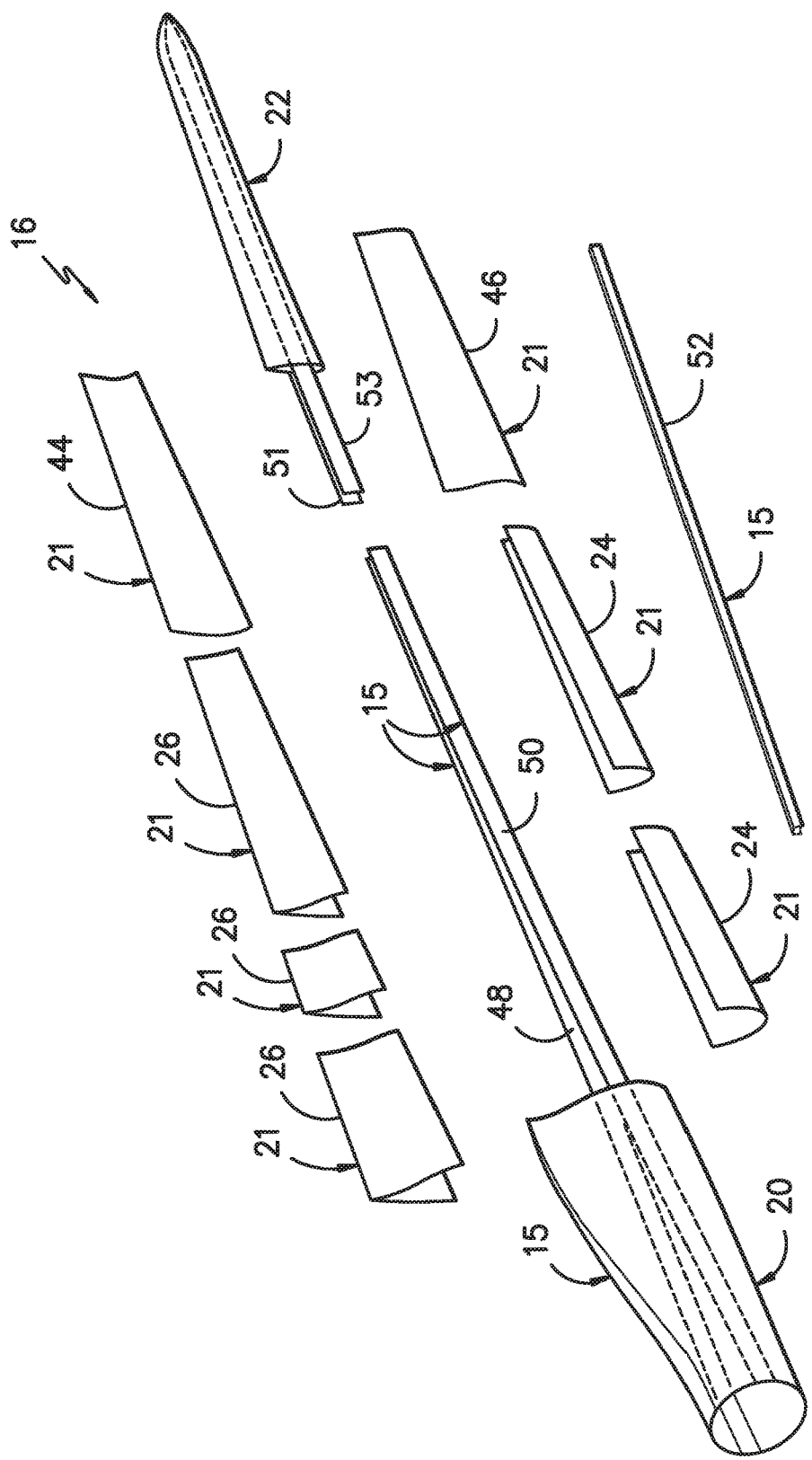
FIG. -3-

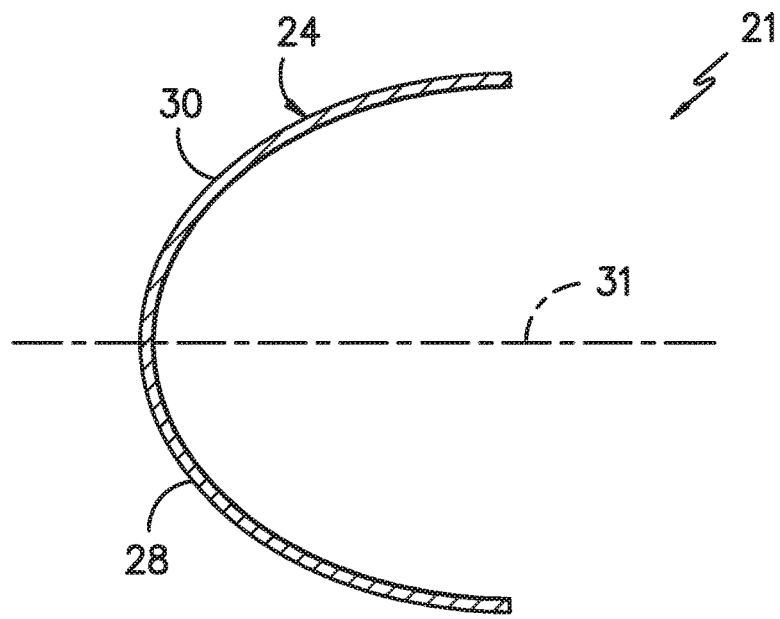
FIG. -4-
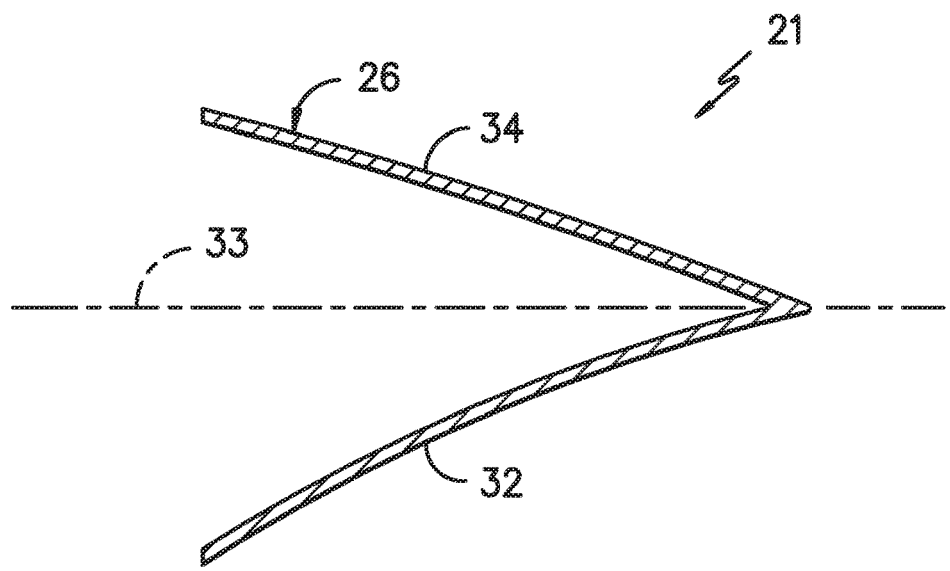
FIG. -5-

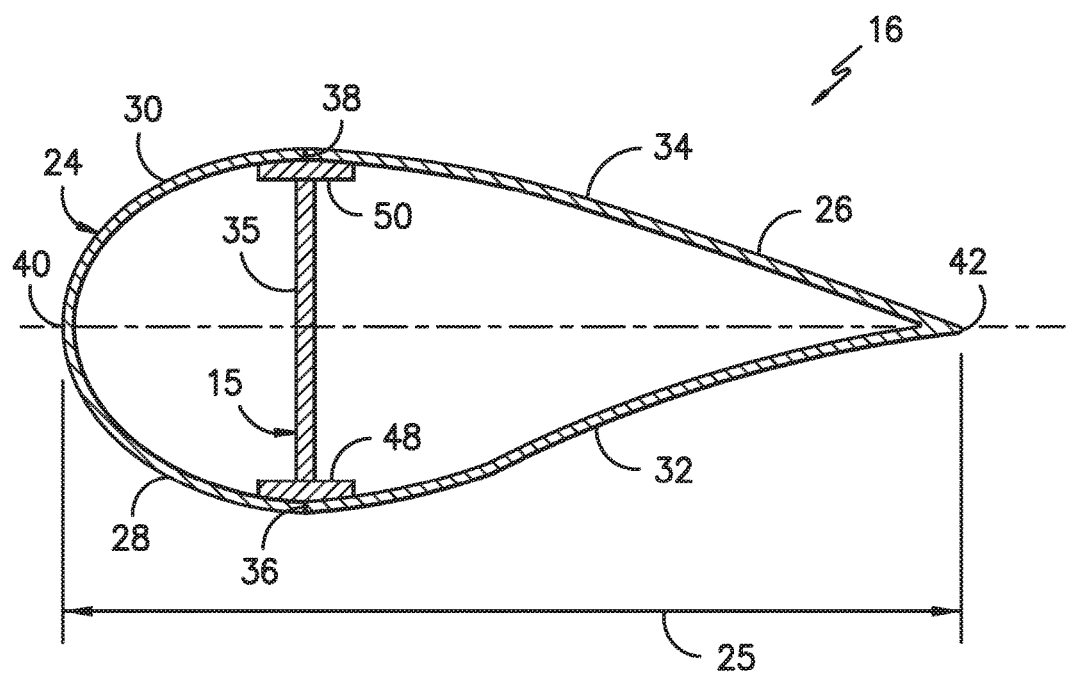
FIG. -6-
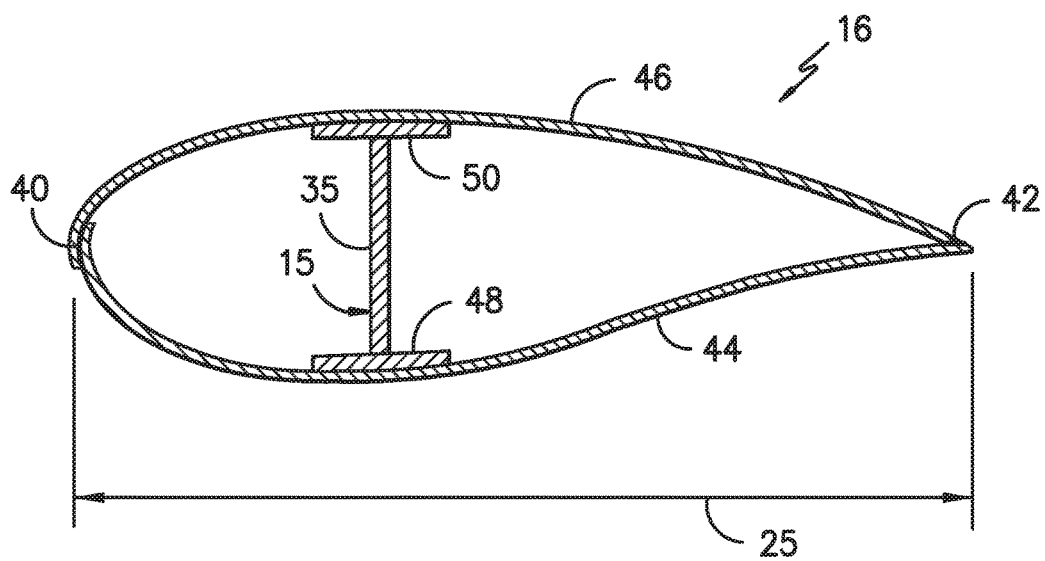
FIG. -7-

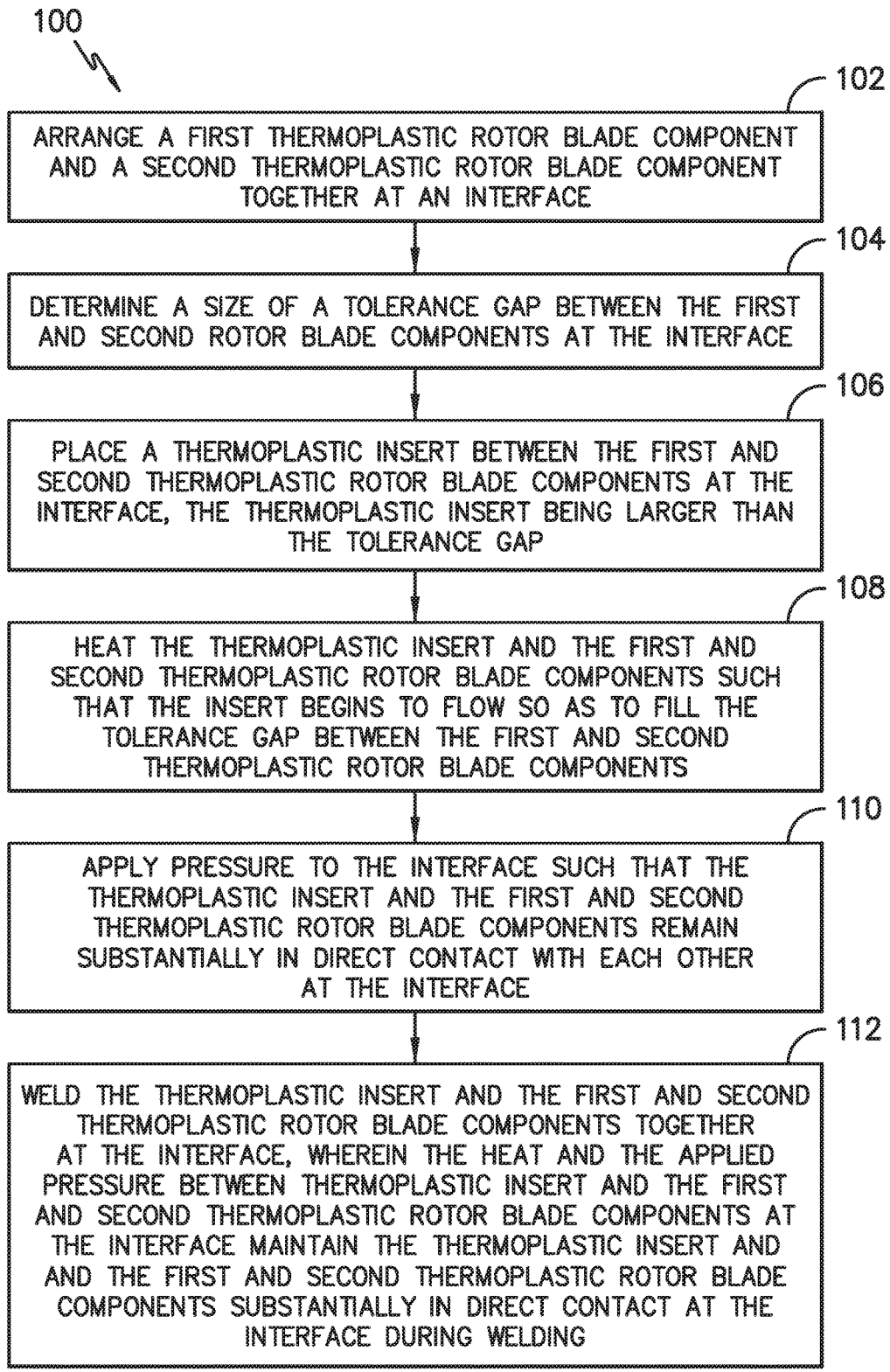
FIG. -8-

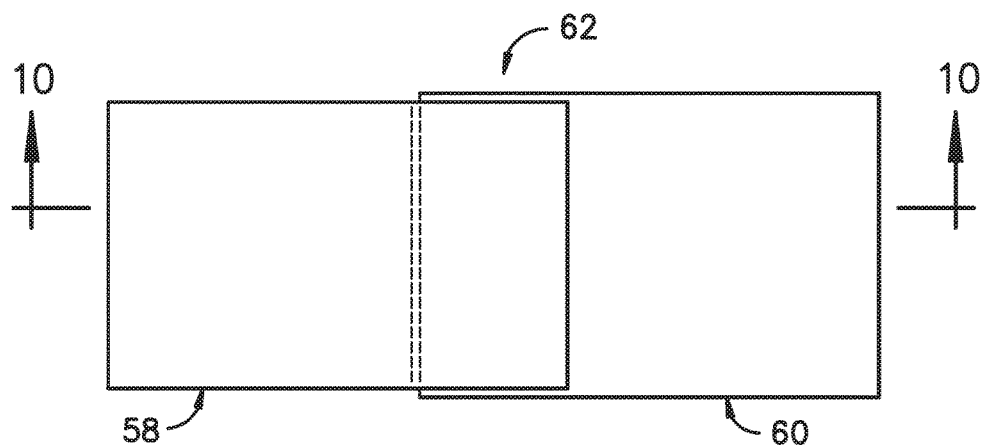
FIG. -9-
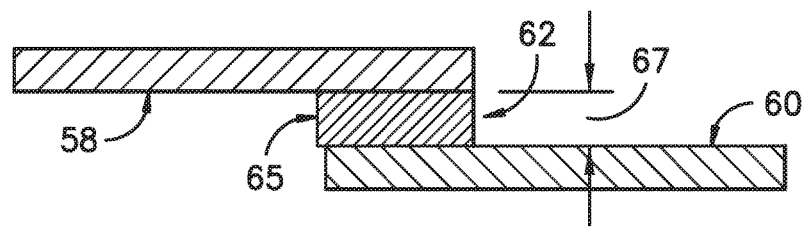
FIG. -10-

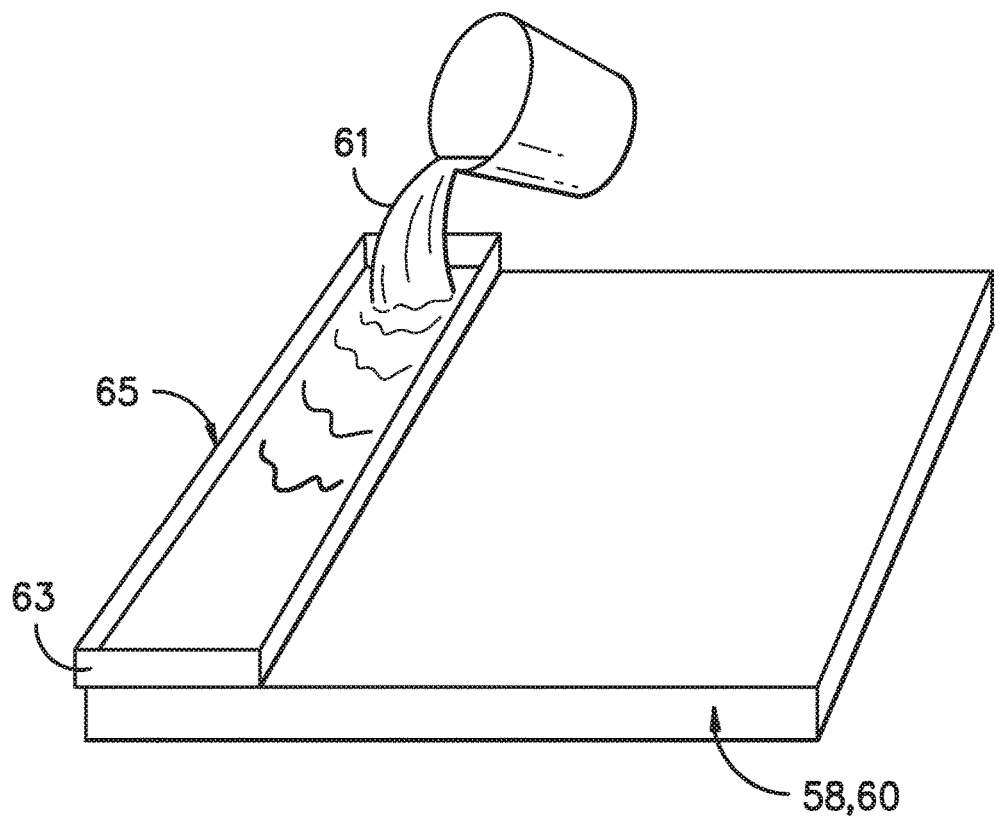
FIG. -11-
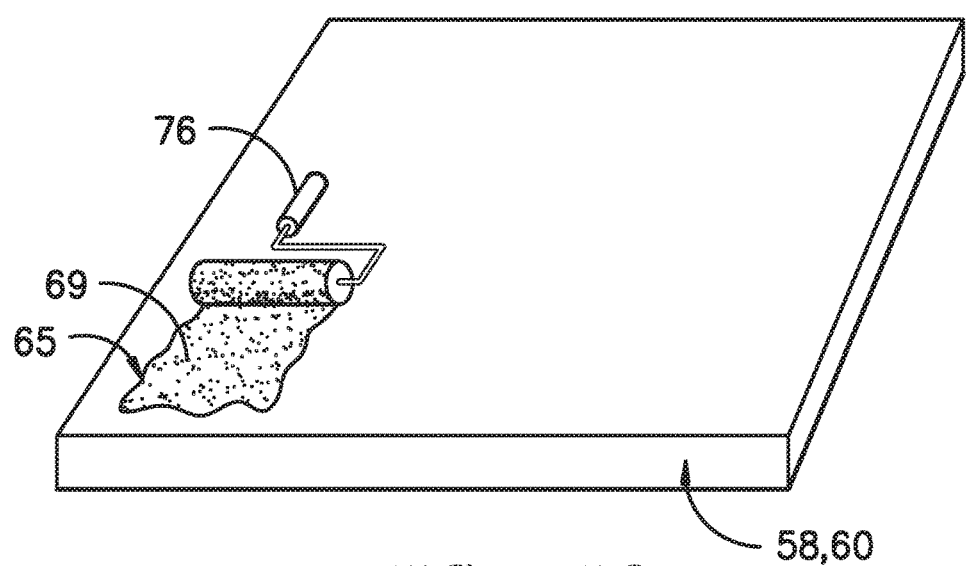
FIG. -12-

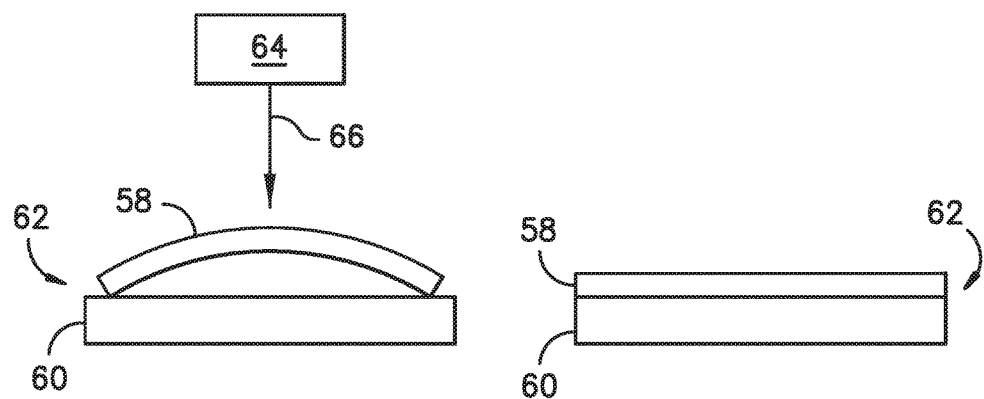
FIG. -13-
FIG. -14-
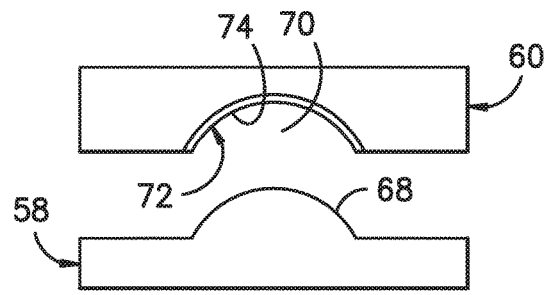
FIG. -15-
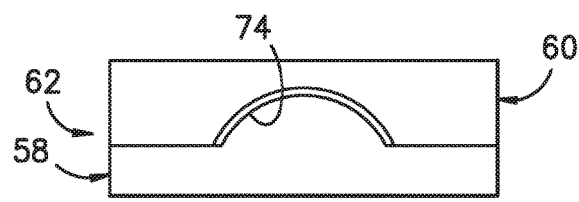
FIG. -16-

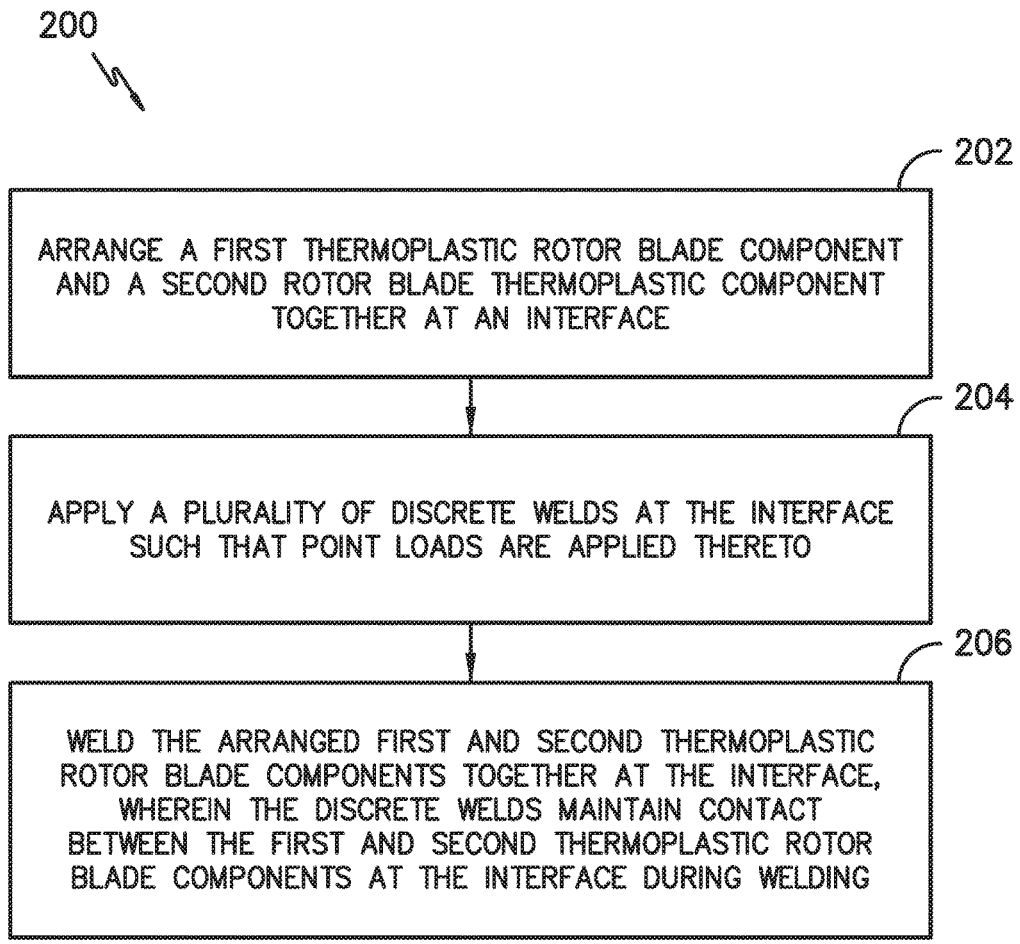
FIG. -17-

METHODS OF JOINING ROTOR BLADE COMPONENTS USING THERMOPLASTIC WELDING

FIELD OF THE INVENTION

The present disclosure relates generally to wind turbine rotor blades, and more particularly to methods for joining rotor blade components using various thermoplastic welding techniques.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

In addition, methods for manufacturing wind turbine rotor blades may include forming the rotor blades in blade segments. The blade segments may then be assembled to form the rotor blade. For example, some modern rotor blades, such as those blades described in U.S. patent application Ser. No. 14/753,137 filed Jun. 29, 2105 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component. More specifically, the blade segments may be constructed of a thermoplastic material and/or a thermoset material.

Methods of joining thermoset components to each other as well as to thermoplastic materials continue to be an issue. For example, joining predominately thermoset parts and/or joining a predominately thermoset part with a thermoplastic part conventionally requires the use of expensive adhesives and/or fasteners, both of which add weight and cost to the blade. As such, it is advantageous to use thermoplastic rotor blade components where possible so that like components can be easily joined, e.g. via thermoplastic welding.

Even still, thermoplastic welding of blade components also has issues that need to be addressed. For example, one challenge with current thermoplastic welding techniques involves maintaining intimate contact between the surfaces to be welded throughout the heating and cooling cycle of the welding process.

Thus, the present disclosure art is directed to improved thermoplastic welding techniques for rotor blade components that address the aforementioned issues.

BRIEF DESCRIPTION OF THE INVENTION

Aspects and advantages of the invention will be set forth in part in the following description, or may be obvious from the description, or may be learned through practice of the invention.

In one aspect, the present disclosure is directed a method for welding thermoplastic rotor blade components together. The method includes arranging a first thermoplastic component and a second thermoplastic component together at an interface. The method also includes determining a size of a tolerance gap between the first and second thermoplastic components at the interface. Further, the method includes placing a thermoplastic insert between the first and second thermoplastic components at the interface. More specifically, the thermoplastic insert is larger than the tolerance gap. In addition, the method includes heating the thermoplastic insert and the first and second thermoplastic components such that the thermoplastic insert begins to flow so as to fill the tolerance gap between the first and second thermoplastic components. Moreover, the method includes applying pressure to the interface such that the thermoplastic insert and the first and second thermoplastic rotor blade components remain substantially in direct contact with each other at the interface. Thus, the method further includes welding the thermoplastic insert and the first and second thermoplastic rotor blade components together at the interface, wherein the heat and the applied pressure between the thermoplastic insert and the first and second thermoplastic rotor blade components at the interface maintain the thermoplastic insert and the first and second components substantially in direct contact at the interface during welding.

In one embodiment, at least a portion of the thermoplastic insert seeps from the interface after the pressure and heat is applied. In such embodiments, the method may also include removing at least a portion of the thermoplastic insert that seeps from the interface and/or smoothing at least a portion of the thermoplastic insert that seeps from the interface.

In another embodiment, the step of placing the thermoplastic insert between the first and second thermoplastic components at the interface may include coating one or more layers of a thermoplastic resin onto at least one of the first and second thermoplastic components at the interface.

Alternatively, the step of placing the thermoplastic insert between the first and second thermoplastic components at the interface may include placing a temporary barrier onto one of the first or second thermoplastic components at the interface, pouring one or more un-polymerized components into the temporary barrier, allowing the one or more un-polymerized components to polymerize so as to form the thermoplastic insert, and removing the temporary barrier.

In still another alternative embodiment, the step of placing the thermoplastic insert between the first and second thermoplastic components at the interface may include applying one or more coats of un-polymerized components at the interface and allowing the one or more coats of un-polymerized components to polymerize so as to form the thermoplastic insert.

In further embodiments, the thermoplastic insert may include at least one of a wire mesh (e.g. any metal or conductive mesh), tape, one or more shims, an adhesive, one or more fiber materials embedded therein, or similar. More specifically, in certain embodiments, the fiber material may include glass fibers, carbon fibers, polymer fibers, ceramic fibers, nanofibers, metal fibers, or similar.

In another embodiment, the method may include securing the thermoplastic insert and the first and second thermoplastic rotor blade components together during welding so as to maintain the substantially direct contact. More specifically, in certain embodiments, the step of securing the insert and the first and second thermoplastic rotor blade components together during welding may include applying, via an adjustable tooling device, one or more point loads at the interface so as to cause the first thermoplastic component to flex to fit the second thermoplastic component.

In further embodiments, one of the first and/or second thermoplastic rotor blade components may be concave or convex and the other first and/or second thermoplastic rotor blade components may be flat.

In additional embodiments, the method may further include supporting at least one of the first or second thermoplastic rotor blade components during welding so as to prevent distortion of the components during welding.

In yet another embodiment, the method may include welding a plurality of discrete welds at the interface so that point loads are applied thereto.

In still further embodiments, the first thermoplastic component may include a raised area and the second thermoplastic component may include a recessed area. In such embodiments, the raised and recessed areas may form the interference fit when the first and second thermoplastic rotor blade components are arranged together. In particular embodiments, the method may further include applying adhesive within the recessed area and subsequently welding the first and second thermoplastic rotor blade components together.

In another aspect, the present disclosure is directed to a method for welding thermoplastic rotor blade components together. The method includes arranging a first thermoplastic rotor blade component and a second rotor blade thermoplastic component together at an interface. Further, the method includes applying a plurality of discrete welds at the interface such that point loads are applied thereto. In addition, the method includes welding the arranged first and second thermoplastic rotor blade components together at the interface, wherein the discrete welds maintain contact between the first and second thermoplastic rotor blade components at the interface during welding. It should be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure along line 6-6;

FIG. 7 illustrates a cross-sectional view of the modular rotor blade of FIG. 2 according to the present disclosure along line 7-7;

FIG. 8 illustrates a flow diagram of one embodiment of a method for welding thermoplastic rotor blade components together according to the present disclosure;

FIG. 9 illustrates a schematic diagram of one embodiment of the first and second thermoplastic blade components arranged together an interface according to the present disclosure;

FIG. 10 illustrates a cross-sectional view of the interface of FIG. 9 along line 10-10;

FIG. 11 illustrates a schematic diagram of one embodiment of one of the thermoplastic blade components according to the present disclosure, particularly illustrating a temporary barrier arranged thereon with un-polymerized components being poured therein;

FIG. 12 illustrates a schematic diagram of another embodiment of one of the thermoplastic blade components according to the present disclosure, particularly illustrating un-polymerized components being spread thereon;

FIG. 13 illustrates a schematic diagram of one embodiment of first and second thermoplastic rotor blade components arranged together according to the present disclosure;

FIG. 14 illustrates a schematic diagram of the embodiment of FIG. 13 with the first and second thermoplastic rotor blade components being held in substantially direct contact with each other according to the present disclosure;

FIG. 15 illustrates a schematic diagram of another embodiment of first and second thermoplastic rotor blade components arranged together according to the present disclosure;

FIG. 16 illustrates a schematic diagram of the embodiment of FIG. 15 with the first and second thermoplastic rotor blade components being held together via an interference fit that includes a raised area of the first thermoplastic rotor blade component that fits into a corresponding recessed area of the second thermoplastic rotor blade component; and FIG. 17 illustrates a flow diagram of one embodiment of a method for welding thermoplastic rotor blade components together according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for joining rotor blade components using thermoplastic welding. For example, one embodiment of the method includes arranging first and second thermoplastic components together at an interface. Further, the method includes determining a size of a tolerance gap between the first and second components at the interface and placing a thermoplastic insert between the components at the interface. More specifically, the insert is sized to be larger than the tolerance gap. As such, the method also includes heating the insert and the first and second components such that the insert begins to flow so as to fill the tolerance gap between the first and second components. In addition, the method includes applying pressure to the interface such that the insert and the first and second blade components remain substantially in direct contact with each other at the interface. More particularly, the method includes welding the insert and the components together at the interface, wherein the heat and the applied pressure maintains the insert and the first and second substantially in direct contact during welding.

Thus, the present disclosure provides many advantages not present in the prior art. For example, when manufacturing large scale wind blade components, manufacturing tolerances of fiberglass reinforced thermoplastic materials can be an obstacle for ensuring mating surfaces that, when assembled for welding, maintain intimate contact throughout the welding cycle in areas requiring a sufficient bond. As such, unintended gaps can be a challenge in at least some areas. Since wholesale bonding of blade components with adhesives can be time consuming and expensive, methods of thermoplastic welding that address such unintended gaps improves quality, cycle time, weight, and costs associated with manufacturing rotor blade components.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, polymer fibers, ceramic fibers, nanofibers, metal fibers, or similar or combinations thereof. In addition, the direction of the fibers may include biaxial, unidirectional, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

Referring particularly to FIGS. 2-7, any number of blade segments 21 having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials. More specifically, in certain embodiments, the blade segments 21 may include any one of or combination of the following blade segments: pressure and/or suction side segments 44, 46, (FIGS. 2 and 3), leading and/or trailing edge segments 24, 26 (FIGS. 2-6), a non-jointed segment, a single-jointed segment, a multi-jointed blade segment, a J-shaped blade segment, or similar.

More specifically, as shown in FIG. 4, the leading edge segments 24 may have a forward pressure side surface 28 and a forward suction side surface 30. Similarly, as shown in FIG. 5, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16. In addition, as particularly shown in FIG. 6, the leading edge segment(s) 24 and the trailing edge segment(s) 26 may be joined at a pressure side seam 36 and a suction side seam 38. For example, the blade segments 24, 26 may be configured to overlap at the pressure side seam 36 and/or the suction side seam 38. Further, as shown in FIG. 2, adjacent blade segments 24, 26 may be configured to overlap at a seam 54. Thus, where the blade segments are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive 56 (or mechanical fasteners) configured between the overlapping leading and trailing edge segments 24, 26 and/or the overlapping adjacent leading or trailing edge segments 24, 26.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 24, 26 can be mounted thereto.

As mentioned, the various rotor blade components described herein may be constructed of various thermoplastic materials. Accordingly, such materials can be easily welded together, e.g. using thermoplastic welding. Such welding techniques, however, may be prone to non-uniform gaps between the surfaces of the components to be welded. As such, FIGS. 8-17 are directed to improved methods for welding thermoplastic rotor blade components together using various techniques configured to maintain intimate contact between the surfaces to be welded throughout the heating and cooling cycle of the welding process.

Referring particularly to FIG. 8, as shown at 102, the method 100 includes arranging a first thermoplastic component 58 and a second thermoplastic component 60 together at an interface 62. As shown at 104, the method 100 includes determining a size of a tolerance gap 67 between the first and second thermoplastic rotor blade components 58, 60 at the interface 62. For example, as shown in FIG. 10, the tolerance gap 67 between the two components 58, 60 is generally defined as the space between two components due to manufacturing variations. Such gaps are common and can cause welding issues since the two components 58, 60 resist staying in direct contact with one another. Thus, as shown at 106, the method 100 includes placing a thermoplastic insert 65 between the first and second thermoplastic rotor blade components 58, 60 at the interface 62. More specifically, as shown, the thermoplastic insert 65 is larger than the tolerance gap 67. Further, in certain embodiments, the thermoplastic insert 65 may also include a wire mesh, such as a metallic or any other conductive mesh, or one or more fiber materials embedded therein. For example, the fiber materials may include glass fibers, carbon fibers, polymer fibers, ceramic fibers, nanofibers, wood fibers, bamboo fibers, or metal fibers.

For example, as shown in FIG. 11, the step of placing the thermoplastic insert 65 between the first and second thermoplastic components 58, 60 at the interface 62 may include placing a temporary barrier 63 onto one of the first or second thermoplastic components 58, 60 at the interface 62, pouring one or more un-polymerized components 61 in a liquid state into the temporary barrier 63, allowing the one or more un-polymerized components 61 to polymerize so as to form the thermoplastic insert 65, and removing the temporary barrier 63. In one embodiment, the temporary barrier 63 may be constructed of any suitable materials, e.g. such as clay and may have any suitable thickness to create the desired thickness of the insert 65.

Alternatively, as shown in FIG. 12, the step of placing the thermoplastic insert 65 between the first and second thermoplastic components 58, 60 at the interface 62 may include applying one or more coats 69 of un-polymerized components at the interface 62 and allowing the one or more coats 69 of un-polymerized components to polymerize so as to form the thermoplastic insert 65. More specifically, as shown, the coats 69 of un-polymerized components may be applied to the components 58, 60 via an applicator 76, such as a roller.

For the embodiments of FIGS. 11 and 12, thicker buildups of the insert 65 can be obtained in several ways. For example, the method 100 may include applying a coat of un-polymerized components (e.g. raw chemical compounds), allowing the coat to polymerize, and then applying another coat, and so on, until the desired buildup is reached. Alternatively, the method 100 may include applying an appropriate filler (e.g. glass beads, glass fibers, glass mat, and/or any other suitable fillers) to increase the viscosity of the un-polymerized components, which allows for a thicker build-up by creating a material having a thick paste consistency. In one embodiment, for example, a glass mat, such as a low-density chopped strand mat, may allow for hand layup of discrete layers with a high resin content but also with additional structure.

In still another alternative embodiment, the step of placing the thermoplastic insert 65 between the first and second thermoplastic components 58, 60 may include coating one or more layers of a thermoplastic resin (i.e. already polymerized) onto one or more of the first and second thermoplastic components 58, 60 at the interface 62. In such an embodiment, the layers of un-polymerized components may be applied to the components 58, 60 via any suitable applicator, such as the roller 76 shown in FIG. 12.

After placing the thermoplastic insert 65 at the interface 62, as shown at 106, the method 100 includes heating the insert 65 and the first and second thermoplastic rotor blade components 58, 60 such that the insert 65 begins to flow so as to fill any gaps (such as the tolerance gap 67) between the first and second thermoplastic rotor blade components 58, 60. In addition, as shown at 108, the method 100 also includes applying pressure to the interface 62 such that the thermoplastic insert 65 and the first and second thermoplastic rotor blade components 58, 60 remain substantially in direct contact with each other, e.g. during a welding process.

In such embodiments, at least a portion of the thermoplastic insert 65, when heated, may seep from the interface 62 after the pressure and/or heat is applied. Thus, in certain embodiments, the method 100 may include removing the portion of the thermoplastic insert 65 that seeps from the interface 62 one of the surfaces of the components 58, 60. Alternatively and/or in addition, the method 100 may include smoothing the portion of the thermoplastic insert 65 that seeps from the interface 62 onto one of the surfaces of the components 58, 60.

More specifically, in one embodiment, the component designs can be modified such that when two components are brought together, their respective mating surfaces will interfere. In such embodiments, the first or second thermoplastic rotor blade components 58, 60 may be flexible. Thus, upon applying a load to force the two components together, the mating surfaces to be bonded will flex and conform to one another. In one example, as shown in FIGS. 13 and 14, one of the first or second thermoplastic rotor blade components 58, 60 may be concave or convex, whereas the other first and/or second thermoplastic rotor blade components 58, 60 may be flat. For example, as shown, the first thermoplastic component 58 may have a slightly concave surface that can be applied to the second thermoplastic component 60 having a flat surface by a point load at the crest of the concave surface.

In such embodiments, the stiffness of the mating surfaces should be maintained at a sufficient level during the welding cycle and/or such surfaces must be supported with a tooling device to prevent shape change of the components or unwanted distortion. More specifically, in certain embodiments, the method 100 may further include supporting either or both of the first or second thermoplastic rotor blade components 58, 60 during welding so as to prevent distortion of the components during the welding process. For example, the components may be supported by an additional surface, table, clamp, or similar.

In another embodiment, the method 100 may include securing the first and second thermoplastic rotor blade components 58, 60 together during welding so as to maintain substantially direct contact between the components 58, 60. More specifically, as shown in FIG. 13, the first and second thermoplastic rotor blade components 58, 60 may be secured together during welding by applying, via an adjustable tooling device 64, one or more point loads 66 at the interface 62 so as to cause the first thermoplastic component 58 to flex to fit the second thermoplastic component 60. In certain embodiments, a custom tooling device that conforms to the shape of the components 58, 60 can be utilized. In another embodiment, the adjustable point or line load tooling device 64 can apply load(s) in a target area causing the desired flex to fit the opposing mating surface. In still further embodiments, as shown in FIGS. 15 and 16, the first thermoplastic component 58 may include a raised area 68 and the second thermoplastic component 60 may include a recessed area 70. In such embodiments, the raised and recessed areas 68, 70 may form the interference fit when engaged.

Referring back to FIG. 8, as shown at 110, the method 100 includes welding the thermoplastic insert 65 and the first and second thermoplastic rotor blade components 58, 60 together at the interface 62. As such, the heat and the applied pressure between the thermoplastic insert 65 and the first and second thermoplastic rotor blade components 58, 60 at the interface 62 maintain the thermoplastic insert 65 and the first and second rotor blade components 58, 60 substantially in direct contact at the interface during the welding process. It should be understood that the welding process may utilize any suitable welding technique, including but not limited to laser welding, inductive welding, resistive welding, TIG welding, MIG welding, arc welding, chemical welding, and/or any other suitable welding process now known or later developed in the art.

In certain embodiments, the method 100 may also include welding a plurality of discrete welds at the interface 62 so that point loads are applied thereto. In such an embodiment, rather than heating large areas of the components at one time, a series of discrete welds can be performed along a surface of the component(s) 58, 60 so that point loads are applied at the local site to be welded, thereby ensuring contact in that area. In particular embodiments, ultrasonic welding can be used to implement spot welding.

In additional embodiments, the method 100 may include placing at least one filler material 72 between the first and second thermoplastic rotor blade components 58, 60 at the interface 62. It should be understood that the filler material 72 may be embedded within the thermoplastic insert 65 and/or may be used in conjunction with or separate from the insert 65. Thus, using a filler material 72 between the mating surfaces can absorb laser and/or other wireless energy sources without melting the mating surfaces. More specifically, in certain embodiments, the filler material 72 may include tape, one or more shims, an adhesive, or similar. In further embodiments, the filler material 72 may include a fiber material, including but not limited to glass fibers, carbon fibers, polymer fibers, ceramic fibers, nanofibers, metal fibers, or similar. More specifically, as shown in FIGS. 15 and 16, the method 100 may include applying adhesive 74 within the recessed area 70 of the second thermoplastic component 60 and subsequently welding the first and second thermoplastic rotor blade components 58, 60 together. Thus, the adhesive 74 is configured to initially secure the first and second thermoplastic rotor blade components 58, 60 together during the welding process. The adhesive 74 is then allowed to cure to further secure the components 58, 60 together.

In further embodiments, gaps between the first and second thermoplastic rotor blade components 58, 60 may be filled with thermoplastic fiberglass tape similar to the materials used to construct the components 58, 60. Such tape layers can be built up as needed, i.e. depending on the size and/or shape of the gaps. In additional embodiments, the filler material 72 may serve to fill gaps between adjacent root inserts or gaps between root inserts and the mold surface. Furthermore, the filler material 72 may also be used to fill gaps between the spar plies and skin plies. In another embodiment, the filler material 72 may also be used to fill gaps between the spar caps 48, 50 and core or between adjacent core pieces. In yet another embodiment, the filler material 72 may be used as shims between the spar caps 48, 50 and the shear web 35 to fill gaps before welding the shear webs to the spar caps 48, 50. In still a further embodiment, the filler material 72 may be used to fill gaps between the pressure and suction side shells 44, 46 at the leading or trailing edges 40, 42 of the rotor blade 16.

Referring now to FIG. 17, a flow diagram of another embodiment of a method 200 for welding thermoplastic rotor blade components together is illustrated. As shown at 202, the method 200 includes arranging a first thermoplastic rotor blade component and a second rotor blade thermoplastic component together at an interface. As shown at 204, the method 200 includes applying a plurality of discrete welds at the interface such that point loads are applied thereto. As shown at 206, the method 200 includes welding the arranged first and second thermoplastic rotor blade components together at the interface, wherein the discrete welds maintain contact between the first and second thermoplastic rotor blade components at the interface during welding.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for welding thermoplastic rotor blade components together the method comprising:

arranging a first thermoplastic rotor blade component and a second thermoplastic rotor blade component together at an interface;

determining a size of a tolerance gap between the first and second thermoplastic rotor blade components at the interface;

placing a thermoplastic insert between the first and second thermoplastic rotor blade components at the interface, the thermoplastic insert being larger than the tolerance gap;

heating the thermoplastic insert and the first and second thermoplastic rotor blade components such that the thermoplastic insert begins to flow so as to fill the tolerance gap between the first and second thermoplastic rotor blade components;

applying pressure to the interface such that the thermoplastic insert and the first and second thermoplastic rotor blade components remain substantially in direct contact with each other at the interface; and, subsequently welding the thermoplastic insert and the first and second thermoplastic rotor blade components together at the interface, wherein the heat and the applied pressure between the thermoplastic insert and the first and second thermoplastic rotor blade components at the interface maintain the thermoplastic insert and the first and second rotor blade components substantially in direct contact at the interface during welding.

2. The method of claim 1, wherein at least a portion of the thermoplastic insert seeps from the interface after the pressure and heat is applied.

3. The method of claim 2, further comprising at least one of removing at least a portion of the thermoplastic insert that seeps from the interface or smoothing at least a portion of the thermoplastic insert that seeps from the interface.

4. The method of claim 1, wherein placing the thermoplastic insert between the first and second thermoplastic components at the interface further comprises coating one or more layers of a thermoplastic resin onto one or more of the first and second thermoplastic components at the interface.

5. The method of claim 1, wherein placing the thermoplastic insert between the first and second thermoplastic components at the interface further comprises:
placing a temporary barrier onto one of the first or second thermoplastic components at the interface,
pouring one or more un-polymerized components into the temporary barrier;
allowing the one or more un-polymerized components to polymerize so as to form the thermoplastic insert; and,
removing the temporary barrier.

6. The method of claim 1, wherein placing the thermoplastic insert between the first and second thermoplastic components at the interface further comprises:
applying one or more coats of un-polymerized components at the interface; and,
allowing the one or more coats of un-polymerized components to polymerize so as to form the thermoplastic insert.

7. The method of claim 1, wherein the thermoplastic insert further comprises at least one of a wire mesh, tape, a shim, a conductive material, an adhesive, or one or more fiber materials embedded therein.

8. The method of claim 7, wherein the fiber material comprises at least one of glass fibers, carbon fibers, polymer fibers, ceramic fibers, nanofibers, wood fibers, bamboo fibers, or metal fibers.

9. The method of claim 1, further comprising securing the thermoplastic insert and the first and second thermoplastic rotor blade components together during welding so as to maintain the substantially direct contact.

10. The method of claim 9, wherein securing the first and second thermoplastic rotor blade components together during welding further comprises:
applying, via an adjustable tooling device, one or more point loads at the interface so as to cause the thermoplastic insert to flex against the first and second thermoplastic components.

11. The method of claim 1, wherein the first thermoplastic rotor blade component is concave or convex and the second thermoplastic rotor blade component comprises a different curvature than the first rotor blade component.

12. The method of claim 1, further comprising supporting at least one of the first or second thermoplastic rotor blade components during welding so as to prevent distortion of the components during welding.

13. The method of claim 1, further comprising welding a plurality of discrete welds at the interface so that point loads are applied thereto.

14. The method of claim 1, wherein the first thermoplastic component comprises a raised area and the second thermoplastic component comprises a recessed area, the raised and recessed areas forming an interference fit between the first and second rotor blade thermoplastic components.

15. The method of claim 13, further comprising applying adhesive within the recessed area and subsequently welding the first and second thermoplastic rotor blade components together.

16. A method for welding thermoplastic rotor blade components together, the method comprising:
arranging a first thermoplastic rotor blade component and a second rotor blade thermoplastic component together at an interface;
applying a plurality of discrete, point welds at the interface such that one or more point loads are applied at the interface so as to cause the first thermoplastic rotor blade component to flex to fit the second thermoplastic rotor blade component; and,
subsequently welding the arranged first and second thermoplastic rotor blade components together at the interface, wherein the plurality of discrete, point welds maintain contact between the first and second thermoplastic rotor blade components at the interface during welding.

17. The method of claim 16, further comprising supporting at least one of the first or second thermoplastic rotor blade components during welding so as to prevent distortion of the components during welding.

18. The method of claim 16, further comprising placing at least one filler material between the first and second thermoplastic rotor blade components at the interface, wherein the filler material comprises at least one of a tape, a shim, or an adhesive.

* * * * *